(12) United States Patent
Quinno et al.

(10) Patent No.: US 6,275,379 B1
(45) Date of Patent: Aug. 14, 2001

(54) VISOR DOCKING ARRANGEMENT FOR REMOVABLE TRANSMITTER

(75) Inventors: James L. Quinno, Saline, MI (US); Kimberly C. Leshan, Boise, ID (US); Pawel W. Sleboda, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/523,244

(22) Filed: Mar. 10, 2000

Related U.S. Application Data

(60) Provisional application No. 60/123,612, filed on Mar. 10, 1999.

(51) Int. Cl.$^7$ .................................................. H05K 7/14
(52) U.S. Cl. ........................ 361/686; 361/679; 361/683; 248/316.5; 24/458
(58) Field of Search ................................... 361/679, 683, 361/686; 248/316.5; 24/458

(56) References Cited

U.S. PATENT DOCUMENTS

| | | | | |
|---|---|---|---|---|
| 4,817,253 | * | 4/1989 | Harmatuik | 24/458 |
| 5,054,734 | * | 10/1991 | Gabas | 248/316.5 |

* cited by examiner

Primary Examiner—Leo P. Picard
Assistant Examiner—Yean-Hsi Chang
(74) Attorney, Agent, or Firm—Brooks & Kushman P.C.

(57) ABSTRACT

A visor docking arrangement is provided for a removable transmitter device. The docking arrangement includes a base portion formed with a hinge, such as a living hinge, to allow the base portion to be folded upon itself. One side of the folded base portion is formed as a receiving slot arranged to receive and retain the removable transmitter device. A plurality of mounting pins formed in the base portion on one side of the hinge are arranged to push through the visor and latch with a plurality of mounting holes formed in the base portion on an opposing side of the hinge. A latch or snapping arrangement is formed with the receiving slot so as to latch the removable transmitter device upon insertion into the receiving slot.

6 Claims, 2 Drawing Sheets

VISOR DOCKING ARRANGEMENT FOR REMOVABLE TRANSMITTER

This application claims benefits of 60/123,612 Mar. 10, 1999.

TECHNICAL FIELD

The present invention relates to portable remote keyless entry (RKE) type transmitters, and more particularly, to an arrangement that can be easily attached to the interior of a vehicle to provide removable mounting of a transmitter unit to a visor.

BACKGROUND ART

Generally, the use of remote keyless entry (RKE) systems in vehicle has become common. Such systems typically include a portable, handheld RF transmitter unit arranged to transmit a signal to a receiver unit mounted in the vehicle to allow remote locking and unlock of doors, or unlatching of a trunk. Such transmitters are generally formed having a housing or fob that can attach to a person's key chain.

However, RKE systems are being developed that allow the transmitter to operate nonvehicle security systems in addition to the normal vehicle devices. For example, an RKE system can be arranged so that the transmitter unit generates a signal to operate a garage door opener. While such RKE systems provide enhanced convenience to a user by reducing the number of separate transmitter units needed to operate each of the respective systems, affixing the transmitter to a key chain makes use of the transmitter difficult when the keys are in the ignition of the vehicle. As a result, a need exists for an arrangement that allows a transmitter to be securely mounted to an accessible area of the vehicle, such as a sun visor, but also allows easy removal of the transmitter by a user upon exiting of the vehicle.

DISCLOSURE OF INVENTION

It is therefore an object of the present invention to provide a docking arrangement for a portable transmitter unit that can be easily attached to the interior of a vehicle, and allows a portable transmitter to be securely retained and removed when desired.

It is another object of the present invention to provide a docking arrangement for a portable transmitter unit that can be securely mounted to a vehicle visor, and allows a portable transmitter to be securely docked therein or removed when desired;

It is yet another object of the present invention to provide a low cost docking arrangement for a portable transmitter unit that can be folded about and affixed to a visor in a vehicle.

In accordance with these and other objects, the present invention provides a docking element for a removable transmitter device having a docking base portion formed with a hinge to allow the base portion to be folded upon itself, receiving slot formed in the base portion so as to receive and retain the removable transmitter device, and a plurality of mounting pins formed in the base portion on one side of the hinge. A plurality of mounting holes are formed in the base portion on an opposing side of the hinge from the plurality of mounting pins. The holes are positioned and arranged to receive and retain the mounting pins when the base portion is folded upon itself. A moveable transmitter retention member is positioned in the receiving slot and arranged to latch the removable transmitter device upon insertion into the receiving slot. The base portion can then be folded about a visor in the vehicle, and the mounting pins pushed through the visor so as to engage the mounting holes and attached the base portion to the visor.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
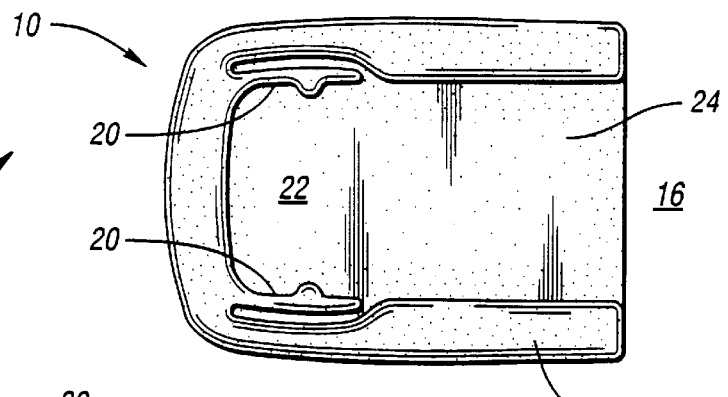
FIG. 1 is a top view of a removable remote keyless entry/garage door opener transmitter docking base in accordance with the present invention.
Figure 2:
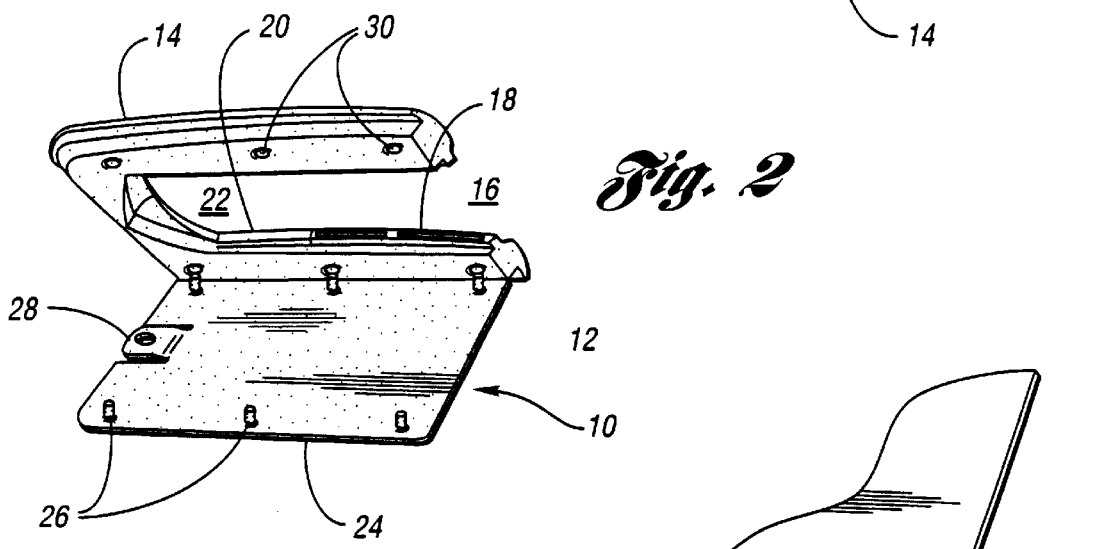
FIG. 2 is a perspective view of a visor showing the transmitter docking base prior to attachment.

Referring to FIGS. 1 and 2, a docking base element 10 in accordance with the present invention is formed such as from a molded plastic or other suitable material so as to include a living hinge 12 that allows the base element to be folded upon itself. Alternative hinge arrangements can be used. A docking side portion 14 of the base element is formed as a receiving slot having an open end 16, a grooved track 18 formed along the inside edge of the receiving slot, and a pair of cammed latch/retaining mechanisms 20 positioned at a closed end 22.

Docking base element 10 further includes a back or closure portion 24 having a set of connecting pins 26 formed therein. Pins 26 can be formed to sprout out at the end thereof to facilitate latching. Backing portion 24 further includes a spring loaded tensioning member 28 arranged to insure that docking base element is tensioned into a snug fit about a visor in a vehicle irrespective of the thickness of the visor. This prevents rattling of the base element after affixing to a visor. The mounting pins 26 are aligned so as to mate with a corresponding mounting hole 30 formed on the underside (i.e. non-exposed facing) of portion 14 when the base docking element is folded upon itself.

Figure 3:
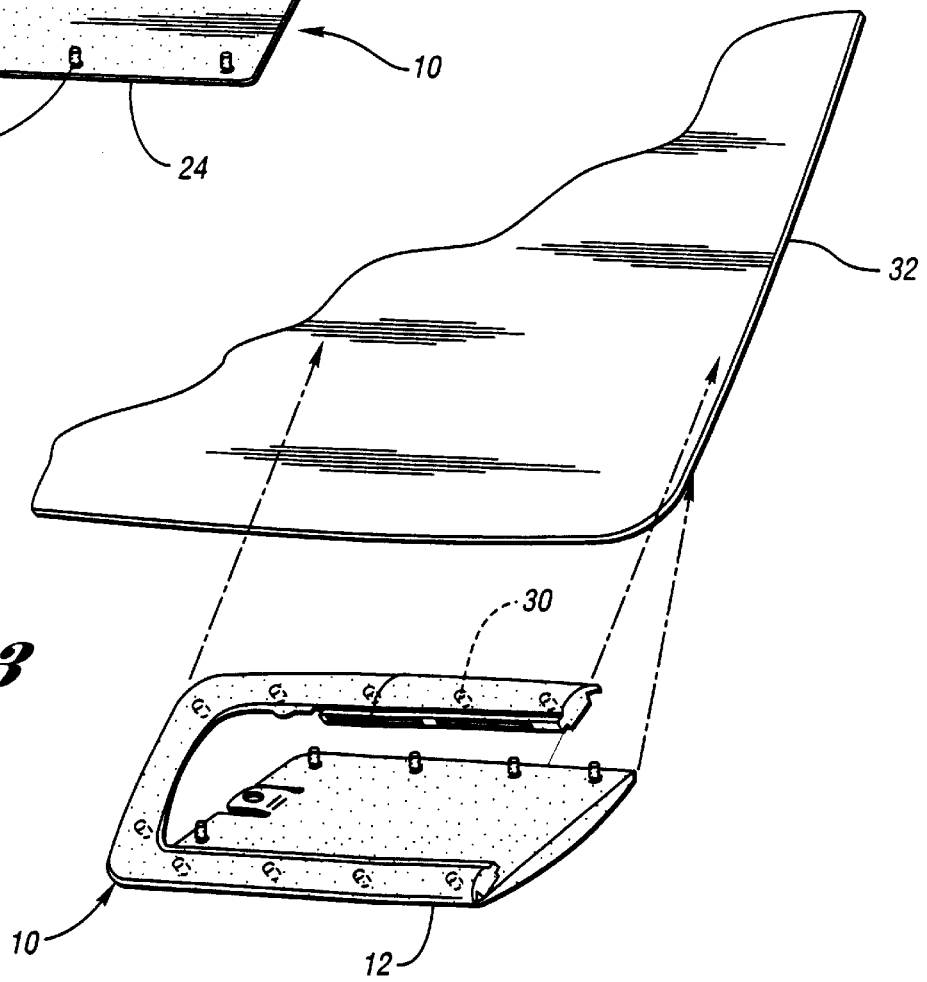
FIG. 3 is a perspective view showing the transmitter docking base being attached to the visor.
Figure 4:
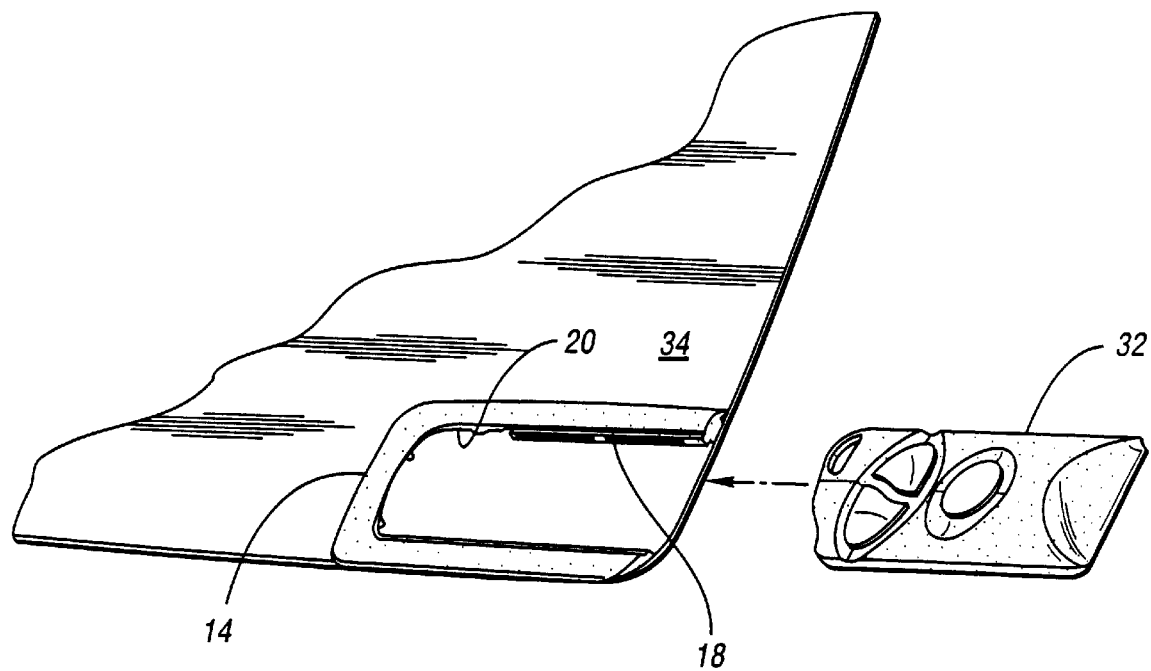
FIG. 4 is a perspective view of a visor showing the transmitter docking base after attachment.
Figure 5:
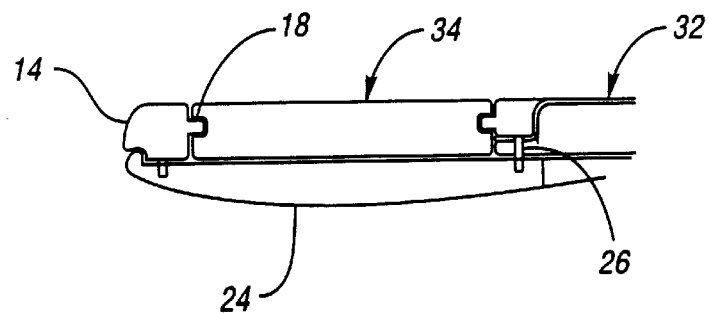
FIG. 5 is an end-view looking lengthwise down the visor showing a transmitter unit docked in the docking base.

FIGS. 3, 4 and 5 illustrate attachment of base docking element 10 to a visor 32 in a vehicle. More specifically, base docking element 10 is folded upon the living hinge and slid about a corner of the visor as generally denoted by the arrows in FIG. 3. Portions 14 and 24 are thus positioned on opposing sides of the visor. Once slid about the visor, portions 14 and 24 of the base docking element are forcibly brought together by a compression or squeezing action so as to cause mounting pins 26 to push through the visor for insertion and mating with the associated mounting hole 30. FIG. 4 illustrates the positioning of the docking base element upon final snapping into place of the mounting pins within the mounting holes.

A portable RKE transmitter unit 34, such as one including circuitry for controlling operation of additional security systems like a garage door opener, can then be slid into the receiving slot/track portion 14 for docking therewith. The transmitter housing can include a channel formed in the side thereof which rides along track 18 when inserted into the base docking element. The cammed retention elements 20 are formed so as to move outwardly away from the transmitter housing upon engaging a suitable detent arrangement formed in the transmitter housing, and latch the transmitter into place after the cam passes the detent. This latching arrangement can be replaced with other suitable latching arrangements. Thus, as the transmitter housing is fully slid into the docking base element, the housing will be snapped and retained into place by elements 20. Retention elements 20 are arranged so that the biasing force to hold the transmitter housing into place can be readily overcome upon deliberate retraction of the transmitter from the base docking element by a user.

FIG. 5 shows an end view of the visor looking from open end 16 toward closed end 22. As seen in this figure, the visor can comprise multiple layers of material, and that pins 26 are arranged to punch through all layers to provide a compression fit for base docking element 10 about the visor.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A docking element for a removable transmitter device comprising:

- a docking base portion formed with a hinge to allow the base portion to be folded upon itself;
- a receiving slot formed in the base portion so as to receive and retain the removable transmitter device;
- a plurality of mounting pins formed in the base portion on one side of the hinge;
- a plurality of mounting holes formed in the base portion on an opposing side of the hinge from the plurality of mounting pins, the holes being positioned and arranged to retain the mounting pins when the base portion is folded upon itself; and
- a moveable transmitter retention member positioned in the receiving slot and arranged to latch the removable transmitter device upon insertion into the receiving slot, wherein the base portion can be folded about a visor in a vehicle, and the mounting pins pushed through the visor into engagement with the mounting holes to attach the base portion to the visor.

2. The docking element of claim 1 wherein the hinge comprises a living hinge.

3. The docking element of claim 1 wherein the movable transmitter retention member comprises a cam.

4. The docking element of claim 1 further comprising a tensioning member connected to the base portion.

5. The docking element of claim 4 wherein the tensioning member is spring loaded.

6. A docking element for a removable transmitter device comprising:

- a docking base portion formed with a hinge to allow the base portion to be folded upon itself;
- a receiving slot formed in the base portion so as to receive and retain the removable transmitter device;
- a plurality of mounting pins formed in the base portion on one side of the hinge;
- a plurality of mounting holes formed in the base portion on an opposing side of the hinge from the plurality of mounting pins, the holes being positioned and arranged to retain the mounting pins when the base portion is folded upon itself;
- a moveable transmitter retention member positioned in the receiving slot and arranged to latch the removable transmitter device upon insertion into the receiving slot, wherein the base portion can be folded about a visor in a vehicle, and the mounting pins pushed through the visor into engagement with the mounting holes to attach the base portion to the visor; and
- a spring loaded tensioning member connected to the base portion.

* * * * *